Jan. 14, 1930.  A. H. KELLING  1,743,275
COATING MACHINE
Filed Dec. 24, 1924    4 Sheets-Sheet 1

INVENTOR:
Alfred H. Kelling
By Nissen &
Crane
ATTYS.

Jan. 14, 1930.   A. H. KELLING   1,743,275
COATING MACHINE
Filed Dec. 24, 1924   4 Sheets-Sheet 3

INVENTOR:
Alfred H. Kelling
BY Nissen &
Crane
ATTYS.

Jan. 14, 1930.  A. H. KELLING  1,743,275
COATING MACHINE
Filed Dec. 24, 1924   4 Sheets-Sheet 4
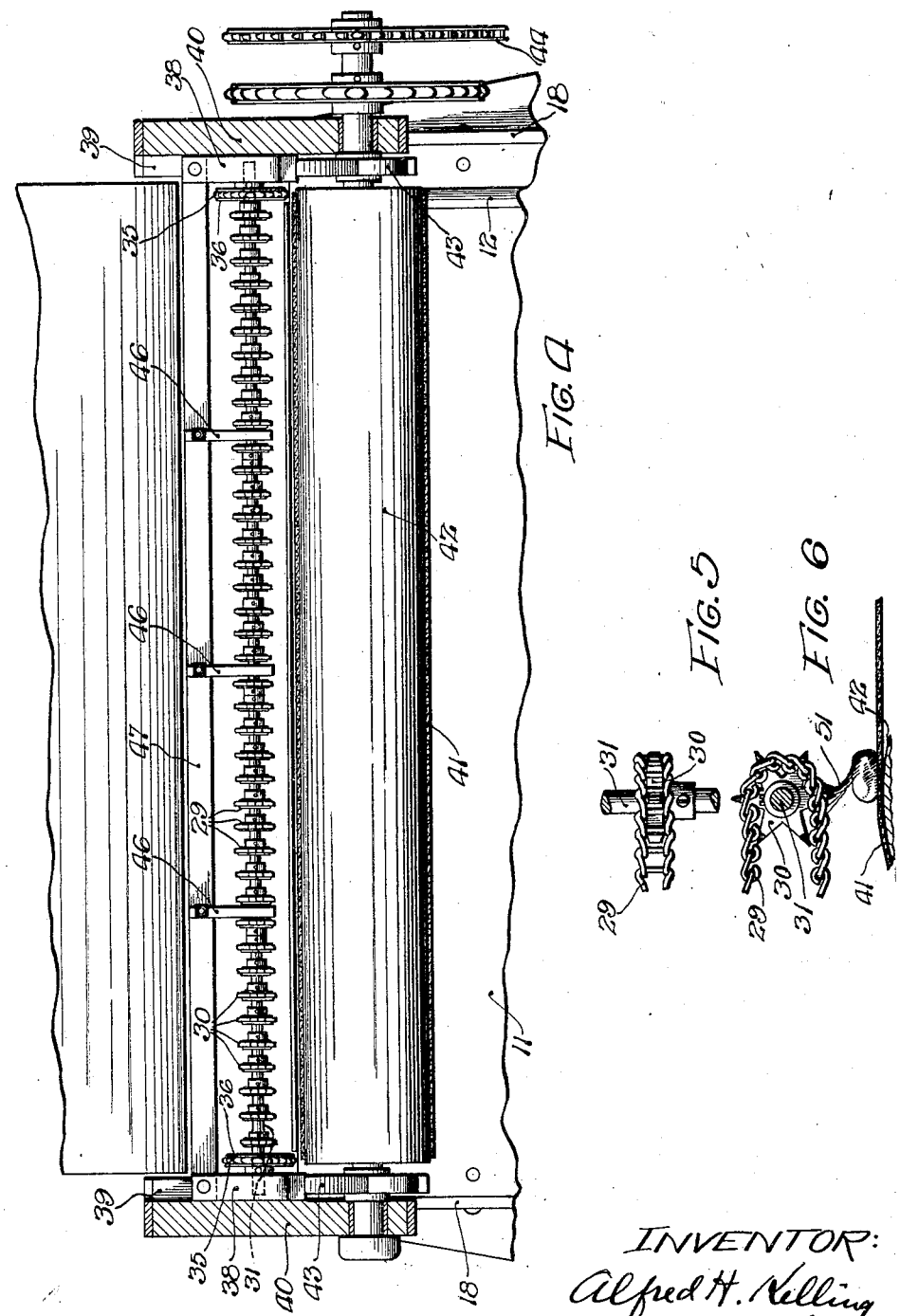
INVENTOR:
Alfred H. Kelling
By Nissen & Crane
ATTYS.

Patented Jan. 14, 1930

1,743,275

UNITED STATES PATENT OFFICE

ALFRED H. KELLING, OF CHICAGO, ILLINOIS

COATING MACHINE

Application filed December 24, 1924. Serial No. 757,787.

This invention relates to a device for coating various articles, such as peanuts or other centers, and has for its object the provision of a device of the class named which shall be of improved construction and operation and which shall lift or elevate the coating material and produce uniformly coated articles of superior quality, each article being separate from the others and in which the coated article shall compare favorably with hand-dipped confections.

The invention is exemplified in the combination and arrangement of parts shown in the accompanying drawings and described in the following specification, and it is more particularly pointed out in the appended claims.

In the drawings—

Fig. 4 is a vertical section on line 4—4 of Fig. 1;

Fig. 5 is a fragmentary top plan view; and

Fig. 6 is an elevation of the discharge end of the coating conveyer.

Figure 1:
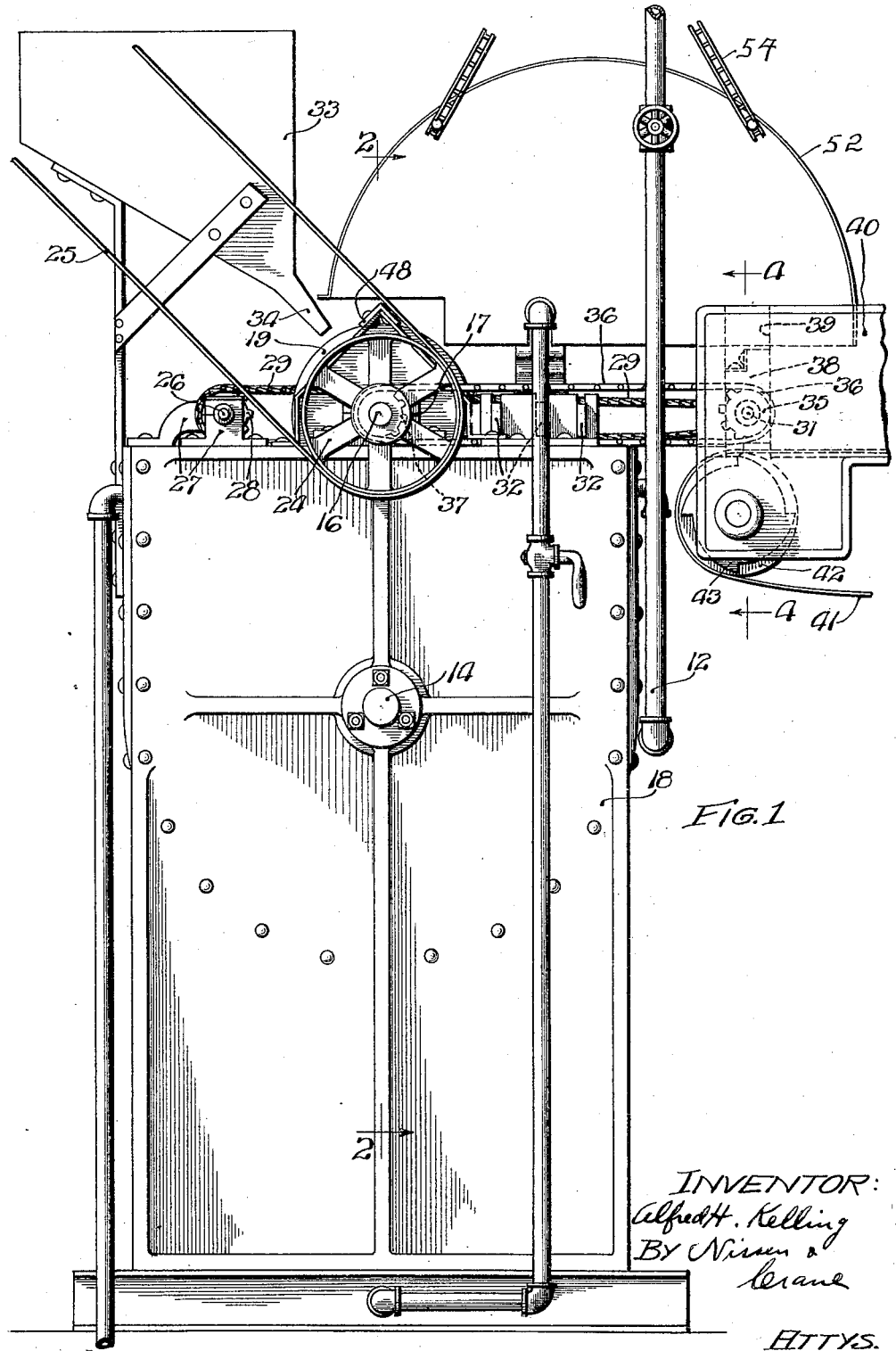
Fig. 1 is an end elevation of the coating apparatus embodying one form of the invention.
Figure 2:
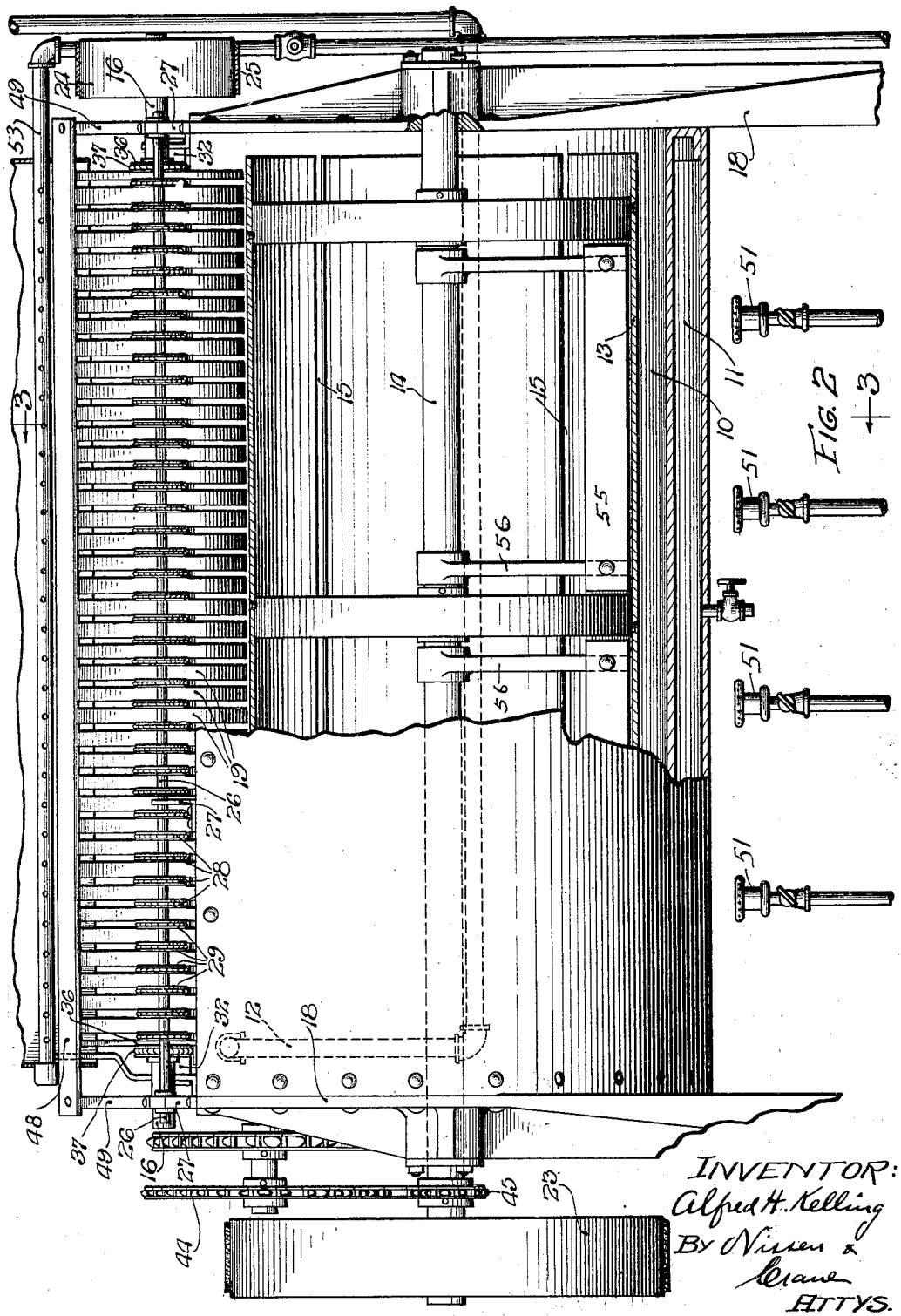
Fig. 2 is a front elevation, with parts in section.

A vat or chamber 10 is provided for the coating material which may be chocolate or other suitable covering. This vat is preferably provided with a jacket 11 to which hot water may be supplied for properly tempering the coating material. A supply pipe 12 is provided for this purpose. Within the chamber 10 there is provided a hollow drum 13 mounted on a shaft 14 to rotate therewith. The drum 13 is open at its ends and is provided with longitudinal slots 15 so that there will be free communication between the interior and exterior of the drum. Above the drum 13 a shaft 16 is journaled in bearings 17 supported on the frame 18 which carries the vat 10.

Figure 3:
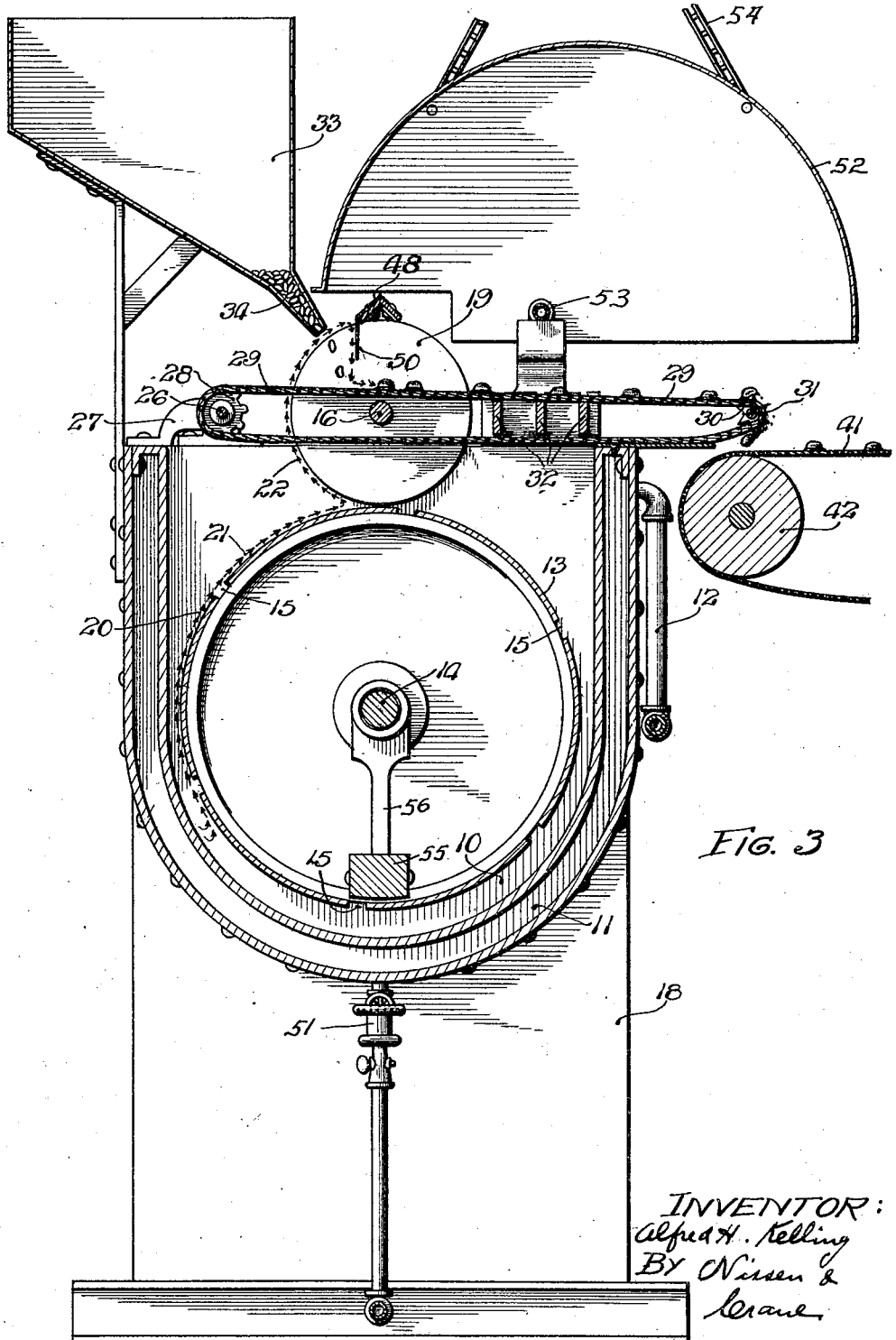
Fig. 3 is a vertical section on line 3—3 of Fig. 2.

The shaft 16 carries a plurality of spaced discs 19, the peripheries of which are disposed closely adjacent the periphery of the drum 13. The discs 19 are disposed closely adjacent the drum 13 so that as the drum 13 is rotated in the melted chocolate the material will be carried upwardly, as indicated by the arrows 20 in Fig. 3, and transferred from the periphery of the drum 13 to the discs 19 whereby the material is elevated and distributed. The drum 13 and the discs 19 may be made of any suitable metal to which the particular material used for the coating will adhere. The rotation of the drum and discs is in the direction of the arrows 21 and 22, respectively, in Fig. 3.

The shaft 14 and the drum 13 thereon is driven directly by a belt pulley 23 and the shaft 16 is driven by a pulley 24 operated by a belt 25. A shaft 26 is supported by brackets 27 on the frame 18 and extends transversely of the machine in alinement with the shaft 16. The shaft 26 carries a plurality of sprocket wheels 28 spaced along the shaft to register with the spaces between the discs 19. The wheels 28 carry sprocket chains 29, the forward ends of which are directed about smaller sprocket wheels 30 carried on a shaft 31 at the opposite sides of the discs 19 from the sprocket wheels 28. The sprocket chains 29 may be supported by transverse bars 32 which will serve to prevent the chains from sagging and at the same time remove excess chocolate from the lower faces of the chains.

Peanuts or other articles to be coated are fed between the discs 19 onto the sprocket chains 29 by any suitable means. A hopper 33 having spouts 34 is shown diagrammatically in the drawings to indicate any suitable mechanism for feeding the articles one after another between the discs onto the upper faces of the upper runs of the conveyer chains 29. The chains 29 are driven from the shaft 31 which in turn is operated by a sprocket wheel 35 secured to one end thereof having a chain 36 extending thereover and driven by a sprocket wheel 37 on the shaft 16. The shaft 31 is journaled at its ends in bearing blocks 38 which are slidably mounted in guides 39 on the side plates of a receiving conveyer frame 40. The frame 40 has a web or belt 41 carried thereby which passes over a roller 42 to bring the belt 41 beneath the discharge ends of the chains 29. The journal blocks 38 rest upon cam wheels 43 which have a plurality of offset shoulders thereon by means of which the blocks 38 are periodically raised for a short distance and permitted to drop to impart a jarring movement to the shaft 31 and the ends of the conveyer chains 29. This movement dislodges the articles which otherwise might adhere to the lower run of the conveyer chains 29.

The roller 42 and conveyer belt 41 may be operated by a sprocket chain 44 which passes over a sprocket wheel 45 on the shaft 14. The shaft 31 is supported at spaced intervals throughout its length by brackets 46 suspended from a cross bar 47 which is supported by the slide blocks 38. A scraper 48 is carried on uprights 49 supported by the frame 18, the scraper being disposed adjacent the upper faces of the discs 19. To the scraper 48 are attached strips or fingers 50, preferably of metal, which form guides for the coating material and extend down between the discs. It will be apparent that the discs 19 by their rotation will carry the coating material adhering thereto upwardly from the drum 13 and then as the coating material on the peripheries of the discs is carried upwardly it will flow over the sides of the discs, be scraped onto the guides 50, and fall upon the chains 29.

In order to insure complete covering of the articles deposited upon the chains 29 the scraper 48 is provided, which dislodges the coating material from the peripheries of the discs and causes it to flow downwardly by means of the guides 50, as indicated by the arrows, onto the articles deposited on the chains 29. This insures complete covering of the articles with the coating material. It will be seen from Figs. 5 and 6 that the chains 29 are what are known as ladder chains, made of open link-work so that any excess of chocolate readily drains from the articles as they are carried forwardly on the chains.

Since the articles are deposited periodically onto the chains 29 they will be spaced from one another along the chains and as they pass over the sprockets 30 they will drop therefrom onto the belt 41 in entirely separated relation to one another. The belt 41 is of considerable length so that as the articles are carried forwardly the coating will become sufficiently hard to permit the articles to be discharged from the belt at the opposite end in a finished condition. It will be noted from Figs. 5 and 6 that the sprocket wheels 31 are provided with pointed teeth from which streams or strings of chocolate will depend. The sprockets are continually covered with chocolate carried forwardly by the chains and drained from the coated articles. As the articles are jarred from the discharge ends of the chains 29 they are carried backwardly beneath the sprocket wheels because of the somewhat sticky character of the coating material. The articles will be deposited in the relation shown in Fig. 6 and as they are carried forwardly a string of chocolate from one of the sprocket points will be laid across the top of the coated article, as indicated at 51 in Fig. 6. This is a very desirable feature in connection with the coating of the articles since it gives each article the appearance of a hand-dipped chocolate.

Small articles such as peanuts cannot profitably be hand-dipped because of the large number of articles for a given quantity and because of the fact that the price for such articles is not sufficient to justify hand-dipping. Heretofore articles have been deposited upon a surface and the material poured or otherwise deposited upon the articles. By this method it is impossible to avoid some cases in which two or more of the articles are stuck together by the coating material, thus detracting from the value of the product. In the present invention each article is deposited separately upon the cooling belt so that there is no opportunity for the articles to adhere to one another causing what is known as "doubles" or "triples" and each article is given a finish which makes it closely resemble a hand-dipped article. The entire apparatus is simple and economical to manufacture and operate so that the cost is at least favorable comparable with the cost of production under the old methods and the products are far superior to machine-dipped articles as heretofore manufactured.

In order to assist in maintaining uniform temperature of the coating material in the container 10, gas jets 51 may be arranged beneath the container. A cover 52 is suspended above the conveyer 29 and a gas pipe 53 may be arranged across the top of the conveyers having openings to provide jets for preventing hardening of the coating material until the articles have left the conveyer. The cover 52 is supported by chains 54 and may be removed to provide access to the discs 19 and conveyers 25. Stirrer bars 55 are suspended by arms 56 within the drum 13, the arms being rotatably suspended from the shaft 14.

The depth of the material in the chamber 10 may vary so long as a sufficient amount contacts with the drum 13 to be carried upwardly thereby and transferred by the discs 19 to the articles to be covered. The consistency of the coating material may be varied by changing the temperature so as to give the thickness of coating desired. Candy-workers can readily tell the consistency necessary for the particular results sought.

I claim:—

1. Coating mechanism comprising a plurality of conveyers having spaced discharge portions, means for depositing articles in a single line and in spaced relation on each of said conveyers, and a movable member common to all of said conveyors for receiving the articles from said discharge portions, the articles being deposited by said discharge portions onto said movable member in spaced relation from one another in all horizontal directions.

2. Coating mechanism comprising a plurality of conveyers arranged in spaced relation to one another, means for depositing articles on said conveyers in spaced relation to one another, means for coating said articles while on said conveyers, and a member common to all of said conveyors having a movable receiving surface for receiving the articles from said conveyers in spaced relation to one another in all horizontal directions.

3. Coating mechanism comprising a pair of horizontal spaced members for applying coating material, a conveyer arranged to travel between said members, means for depositing articles on said conveyer, and means for supplying said spaced members with coating material whereby the articles on said conveyer will be coated by said material as they pass between said spaced members.

4. In combination, a pair of spaced discs having lateral upright faces spaced horizontally from each other, a conveyer arranged to travel between and closely adjacent said upright faces, and means for supplying coating material to said faces to be discharged therefrom onto articles positioned between said discs and carried by said conveyor.

5. In combination, a pair of horizontally spaced rotary discs, a conveyer arranged to travel between said discs, means for depositing articles on said conveyer, and means for depositing coating material to articles on said conveyer between said discs, said means including means for applying the material to the peripheries of said discs whereby the material will flow over the faces of said discs.

6. Coating mechanism comprising a container for coating material, a drum rotatably mounted in said container, spaced discs having their peripheries arranged adjacent the periphery of said drum for receiving coating material from said drum conveyers mounted to travel between the lateral faces of adjacent discs, and means for discharging articles between said faces onto said conveyers.

7. Coating mechanism comprising a container, a drum rotatably mounted in said container, a plurality of rotary discs having their peripheries disposed adjacent the periphery of said drum, means for moving articles to be coated between said discs and means for discharging separate articles in spaced relation onto said moving means.

8. In combination, a container for coating material, a drum rotatably mounted in said container, a plurality of spaced discs having their peripheries disposed adjacent the periphery of said drum, means for conducting articles to be coated between said discs, and means for discharging coating material from said discs onto said articles.

9. In combination, a container for coating material, a drum rotatably mounted in said container, a plurality of spaced discs having their peripheries arranged to move adjacent the periphery of said drum to receive coating material from said drum, conveyers extending between said discs for carrying articles, and a scraper disposed adjacent the peripheries of said discs above said conveyer.

10. Coating mechanism comprising a plurality of co-axial spaced discs, means for supplying coating material to the peripheries of said discs, conveyers extending between said discs for conducting articles through the spaces between said discs, and a scraper for dislodging material from the peripheries of said discs to cause said material to flow downwardly onto said articles.

11. Coating mechanism comprising a container for coating material, means for heating said container, a plurality of spaced discs, and means for depositing coating material from said container on the surfaces of said discs, and means for passing articles between adjacent lateral faces of said discs to receive coating material from said discs.

12. A confectionery coating mechanism comprising a container for coating material, means for heating the material within said container, a hollow drum rotatably mounted within said container and having longitudinally extending slots in the wall thereof, and a plurality of horizontally spaced rotary discs for receiving coating material from said drum, said discs having the peripheries thereof disposed adjacent the periphery of said drum the spaces between said discs being greater in depth than width.

13. A confectionary coating mechanism comprising a container, means for heating said container, a hollow drum rotatably mounted in said container, said drum having the ends thereof open and having slots extending longitudinally thereof through the wall of said drum, a plurality of horizontally spaced rotary discs having the peripheries disposed adjacent the periphery of said drum, means for rotating said drum and discs, and means for conducting articles to be coated between said spaced discs.

14. Coating mechanism comprising a movable receiver, and means for depositing a coated article on said receiver, said depositing means having a pointed portion for laying a streamer of coating material upon the surface of said article as said article is moved from said depositing means by said receiver.

15. In combination, a movable receiver for coated articles, means for depositing articles on said receiver, said depositing means having a pointed portion for producing a streamer of coating material from said article to said pointed portion in position to cause said streamer to be laid upon the face of said article as it is moved from its point of deposit.

16. Coating mechanism comprising a receiver, and means for depositing a coated article upon said receiver, said depositing means and article being relatively movable after the deposit of said article to cause a streamer of coating material extending from said depositing means to said article to be laid upon the surface of said article during said relative movement.

17. Coating mechanism comprising a conveyer for coated articles, and a toothed wheel over which said conveyer passes at the discharge end of said conveyer, the teeth of said wheel serving to lay a streamer of coating material upon the surface of the article discharged therefrom.

18. Coating mechanism comprising a plurality of spaced discs, means for supplying coating material to said discs, conveyers extending through the spaces between said discs, means for depositing articles on said conveyers, means for dislodging material from said discs onto said articles, sprocket wheels for guiding the discharge ends of said conveyers, a belt for receiving the articles from said discharge ends, and means for periodically jarring said discharge ends to dislodge the coated articles from said conveyers.

19. Coating mechanism comprising a container for coating material, a drum rotatably mounted in said container, a plurality of spaced discs having their peripheries disposed adjacent the periphery of said drum, conveyers extending through the spaces between said discs, means for depositing articles in spaced relation on said conveyers, means for dislodging coating material from said discs to cause said material to flow downwardly onto said articles, sprocket wheels having pointed teeth for guiding the discharge ends of said conveyers, and a movable belt disposed beneath said sprocket wheels for receiving coated articles therefrom in spaced relation to one another.

20. Coating mechanism comprising a conveyer for a freshly coated article, a guide for the discharge end of said conveyer, the lower run of said conveyer having a free portion adjacent said guide to permit the article on said conveyer to be carried backwardly a short distance beneath the discharge end of said conveyer so that the streamer formed by the separation of said article from said conveyer will be disposed at the forward end of said article and be laid backwardly over said article by the movement of the return run of said conveyer.

21. Coating mechanism comprising a conveyer, means for supplying said conveyer with freshly coated articles, a sprocket wheel over which said conveyer travels at the discharge end thereof, the return of said conveyer having a downwardly and rearwardly inclined portion adjacent said sprocket wheel to permit the articles thereon to be carried backwardly for a short distance, and a member having a movable receiving surface disposed beneath the discharge end of said conveyer to cause a streamer of coating material formed when an article is discharged from said conveyer to be laid backwardly over said article 22. Means for elevating semi-liquid material comprising a drum partially submerged in the material to be elevated, a plurality of spaced discs having their peripheries disposed adjacent the periphery of said drum, and means for rotating said drum and discs.

23. Coating mechanism comprising a drum arranged to rotate in a semi-liquid coating material to elevate the material on its periphery, spaced discs arranged to rotate adjacent said drum to elevate the material from the surface of said drum, and openwork conveyers arranged to travel between said discs and carry articles for receiving coating material elevated by said discs.

24. Coating mechanism comprising spaced rotary discs, conveyers for articles to be coated disposed between said discs, means for supplying a semi-liquid coating material to the outer surfaces of said discs, and fingers extending downwardly between said discs to direct the coating material onto the articles on said conveyers.

25. Coating mechanism comprising a receptacle for holding a semi-liquid coating material, a drum arranged to rotate with its lower portion dipping into said material, spaced discs having their peripheries disposed adjacent said drum for elevating the material from the surface of said drums, ladder chain conveyers arranged to travel between said discs, a scraper for dislodging the coating material from said discs, and fingers extending downwardly from said scraper between said discs for directing the dislodged material onto articles carried on said conveyers.

26. A confectionery coating machine comprising a container for the coating material, means for heating such coating material in said container, a drum rotatably mounted in said container, a plurality of rotary discs spaced apart on a horizontal axis and having their peripheries disposed adjacent the periphery of said drum to receive coating material from the periphery of said drum, means for directing the artcles to be coated between said discs, and a plurality of traveling conveyers one between each disc and the next adjacent disc in position to receive the articles directed between the said discs and in position to cause the articles carried by the conveyers to receive the coating material.

27. A confectionery coating machine comprising a container having a heating jacket, a drum rotably mounted in said container, said drum having openings to permit free passage of the coating material in said container from the exterior of said drum to the interior thereof, a plurality of rotary discs spaced apart and mounted for rotating on a horizontal axis in position for receiving coating material from the periphery of said drum, and a plurality of traveling chain conveyers one between each disc and the next adjacent disc in position to receive the articles to be coated and for permitting the said articles to receive the coating material.

28. In a confectionery coating machine, the combination with a traveling conveyer for receiving coated confectionery, of a star-shaped wheel having a plurality of spaced-apart points at the delivery end of said conveyer, and means for receiving the coated articles from the delivery end of said conveyer while the points of said star-shaped wheel effect the laying of a streamer of coating material over the surface of said coated article as it is delivered by said conveyer to said receiving means.

29. In a confectionery coating machine, the combination with a traveling conveyer for receiving coated confectionery, of another traveling conveyer for receiving the coated articles from the delivery end of said first-named conveyer, said second-named traveling conveyer being spaced from the delivery end of said first-named conveyer and mounted under the same, and means associated with the delivery end of said first-named traveling conveyer for effecting the laying of a streamer of coating material on top of the coated article as it is dropped onto the second-named conveyer.

30. A confectionery coating machine comprising a conveyer having a sprocket wheel at the delivery end thereof, a series of spaced-apart pointed teeth over which said conveyer passes to cause the coated articles to be discharged from said conveyer, and means spaced below the delivery end of said conveyer for receiving by gravity the coated articles from the said conveyer while said teeth serve as points for forming streamers of coating material and operating to lay such streamers upon the articles as they are dropped onto said receiving means.

31. In a confectionery coating machine, the combination with a conveyer for receiving coated articles, said conveyer having a sprocket wheel at the delivery end thereof, of pointed extensions on the teeth of said sprocket wheel, and means under the delivery end of said conveyer and spaced therefrom to cause said teeth to effect streamers of coating material on top of the coated articles as they are dropped from the delivery end of said conveyer to said receiving means.

In testimony whereof I have signed my name to this specification on this 22nd day of December, A. D. 1924.

ALFRED H. KELLING.